United States Patent
Tsai et al.

(10) Patent No.: US 6,722,773 B2
(45) Date of Patent: Apr. 20, 2004

(54) ILLUMINATING DEVICE AND TUBE-LIKE LAMP THEREOF

(75) Inventors: Yi Te Tsai, Tainan (TW); Hung Ching Lee, Tainan (TW); Chou Yu Kang, Tainan (TW); Han Ping Lin, Tainan (TW)

(73) Assignee: Chi Mei Optoelectronics Corp., Shin-Shih (TW)

( * ) Notice: Subject to any disclaimer, the term of this patent is extended or adjusted under 35 U.S.C. 154(b) by 0 days.

(21) Appl. No.: 10/263,549

(22) Filed: Oct. 4, 2002

(65) Prior Publication Data

US 2004/0012971 A1 Jan. 22, 2004

(30) Foreign Application Priority Data

Jul. 22, 2002 (TW) .......................... 91116508 A

(51) Int. Cl.[7] .............................................. F21V 21/00
(52) U.S. Cl. ...................... 362/216; 362/225; 362/396
(58) Field of Search .................. 362/210, 216, 362/217, 223, 225, 260, 369, 390, 396; 349/58, 60

(56) References Cited

U.S. PATENT DOCUMENTS

| 3,712,981 A | * | 1/1973 | Eargle, Jr. .................. 362/216 |
| 4,598,343 A | * | 7/1986 | Sorrell ........................ 362/396 |
| 5,270,910 A | * | 12/1993 | Kile ............................ 362/260 |
| 5,479,328 A | * | 12/1995 | Lee et al. ................... 362/216 |

* cited by examiner

Primary Examiner—Y My Quach Lee
(74) Attorney, Agent, or Firm—Finnegan, Henderson, Farabow, Garrett & Dunner, L.L.P.

(57) ABSTRACT

An illuminating device mainly includes a tube-like lamp disposed in a main body. The tube-like lamp has two terminal portions adapted for electrically connecting to a power source and a bending portion between the terminal portions. The main body is provided with a support having two hooked portions configured to support the tube-like lamp. The present invention further provides another tube-like lamp characterized by having a buffer part securely attached on the bending portion for lessening or absorbing the shock of an impact on the tube-like lamp. The support may has a gap between the hooked portions such that the tube-like lamp fit with sufficient tightness into the gap between the hooked portions thereby immobilizing the tube-like lamp more efficiently and absorbing the shock.

9 Claims, 5 Drawing Sheets

ILLUMINATING DEVICE AND TUBE-LIKE LAMP THEREOF

BACKGROUND OF THE INVENTION

1. Field of the Invention

The present invention relates to an illuminating device and a tube-like lamp thereof, and more specifically relates to a backlight device for a liquid crystal display.

2. Description of the Related Art

Generally, a liquid crystal display includes a liquid crystal panel which has two substrates and a liquid crystal interposed therebetwveen, and an illuminating device such as a backlight unit which is disposed behind the liquid crystal panel. The backlight unit is configured to distribute a light from a light source uniformly over the surface of the liquid crystal panel. Currently, there are a few kinds of backlight units such as direct and edge light types.

The direct type backlight device usually comprises a U shaped lamp disposed inside a housing. The U shaped lamp has two terminal portions adapted for electrically connecting to a power source. Since the terminal portions of the U shaped lamp are located on the same side, the direct type backlight device is typically provided with a fixing mechanism such as a rubber fastener for securely attaching the bending portion of the U shaped lamp to the housing. It is noted that the conventional fastener is typically configured to directly wrap around a part of the bending portion of the U shaped lamp thereby further immobilizing the lamp.

Since the rubber fastener directly wraps around the U shaped lamp, the rubber fastener facilitates the heat dissipation from the bending portion of the U shaped lamp. Therefore, when a liquid crystal display using the aforementioned backlight device is placed in a low temperature environment (such as a 0° C. chamber) for conducting a long-time operation test, the temperature of the bending portion of the U shaped lamp is at least 10 degrees Centigrade lower than that of other portions of the lamp thereby causing the phenomenon of low-temperature pink.

SUMMARY OF THE INVENTION

Therefore, it is an object of the present invention to provide an illuminating device characterized by utilizing a novel fixing mechanism to facilitate the immobilization of tube-like lamps provided therein which overcomes, or at least reduces the above-mentioned problems of the prior art.

According to one embodiment of the present invention, the illuminating device mainly includes a tube-like lamp disposed in a main body. The tube-like lamp has two terminal portions adapted for electrically connecting to a power source and a bending portion between the terminal portions. The tube-like lamp is characterized by having a buffer part, e.g., an O-ring or a C-shaped ring, securely attached on the bending portion for lessening or absorbing the shock of an impact on the tube-like lamp. The main body is provided with a supporting device for engaging the buffer part of the tube-like lamp thereby helping to immobilize the tube-like lamp. Specifically, the supporting device has two hooked portions and a gap between the hooked portions. The hooked portions are configured to support the tube-like lamp, and the buffer part of the tube-like lamp fits with sufficient tightness into the gap between the hooked portions thereby immobilizing the lamp efficiently. The main body typically includes a housing, a reflector interposed between the tube-like lamp and the housing, and a diffusion plate. Specifically, the housing of the main body includes a base and a case body disposed on the base. The reflector is provided between the tube-like lamp and the base of the housing. The diffusion plate seals the top of the case body of the housing. The terminal portions of the tube-like lamp are disposed along one side of the base of the housing.

The illuminating device according to another embodiment of the present invention is characterized in that the main body is provided with a first supporting device having two hooked portions configured to support a first tube-like lamp thereby helping to immobilize the first tube-like lamp. The illuminating device is preferably provided with a second tube-like lamp, a second supporting device having two hooked portions configured to support the second tube-like lamp, and a third supporting device disposed on the main body and disposed between the first tube-like lamp and the second tube-like lamp wherein the third supporting device having two hooked portions configured to support the first tube-like lamp and the second tube-like lamp.

The fixing mechanism of the present invention, i.e., the supporting device, is characterized by utilizing two hooked portions to support the tube-like lamp thereby significantly reducing the heat dissipated from the contact surface between the lamp and the fixing mechanism. Therefore, the phenomenon of low-temperature pink is not observed when a liquid crystal display using the backlight device of the present invention is placed in a low temperature environment (such as a 0° C. chamber) for conducting a long-time operation test.

BRIEF DESCRIPTION OF THE DRAWINGS

Other objects, advantages, and novel features of the invention will become more apparent from the following detailed description when taken in conjunction with the accompanying drawings.

FIG. 4a is a perspective view of one tube-like lamp of FIG.3 on an enlarged scale;

FIG. 4b is a cross-sectional view taken along line 4b—4b of FIG. 4a;

FIG. 5b is a side view of a portion of the tube-like lamp of FIG. 4a engaged with the supporting device of FIG. 5a; and FIG. 5c is a side view of a portion of the tube-like lamp of FIG. 4c engaged with the supporting device of FIG. 5a.

DETAILED DESCRIPTION OF THE PREFERRED EMBODIMENT

Figure 1:
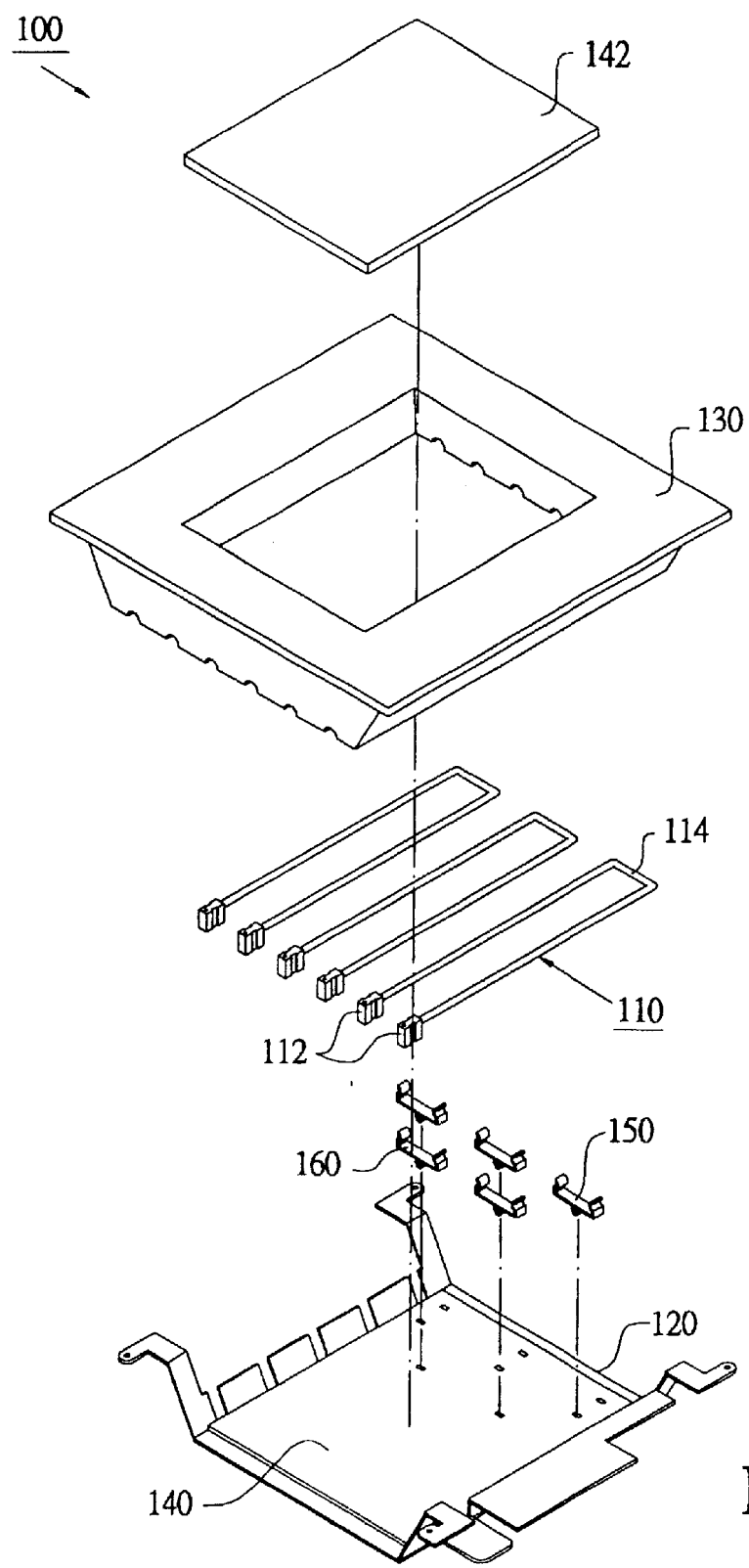
FIG. 1 is an exploded perspective view showing an illuminating device according to one embodiment of the present invention.
Figure 3:
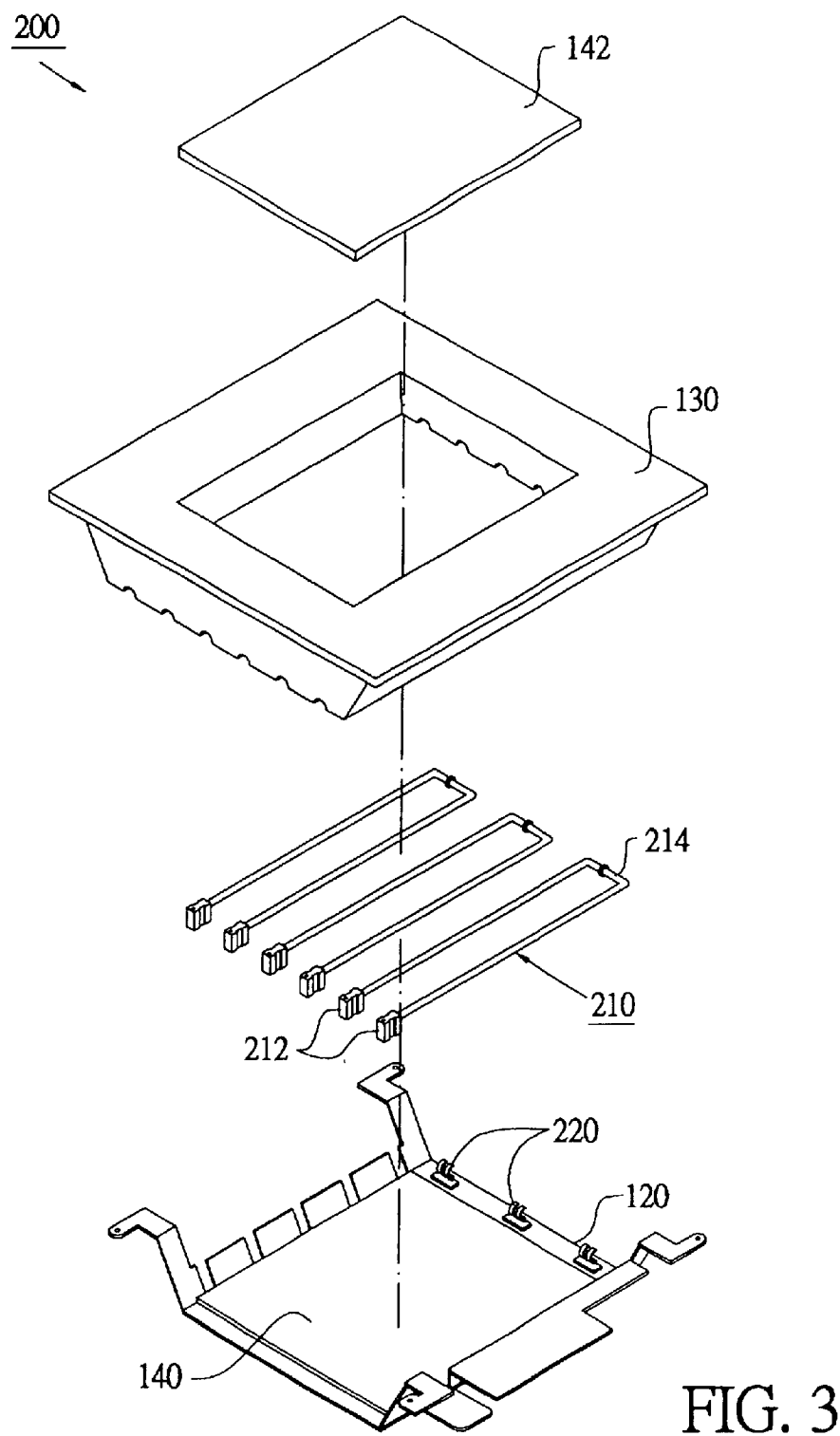
FIG. 3 is an exploded perspective view showing an illuminating device according to another embodiment of the present invention.

FIG. 1 and FIG. 3 illustrate the illuminating devices according to different embodiments of the present invention, and similar components have been given the same reference numerals. These illuminating devices all have a main body comprising a housing (including a base 120 and a case body 130), a reflector 140 and a diffusion plate 142. The diffusion plate 142 seals the top of the case body 130 of the housing.

Figure 2:
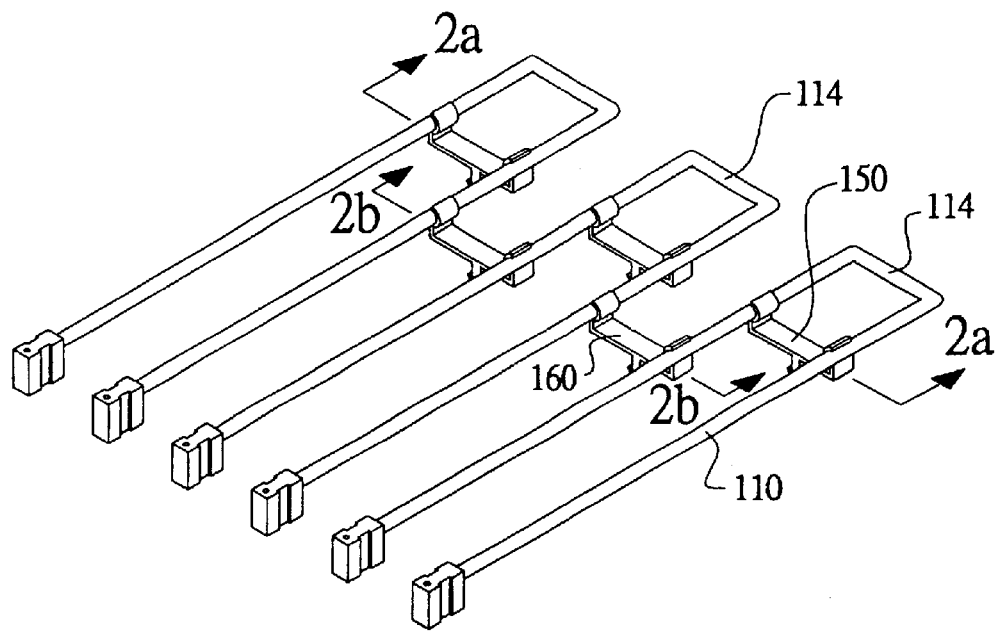
FIG. 2 is a perspective view of the tube-like lamps and the supporting devices for immobilizing the tube-like lamps of FIG. 1 on an enlarged scale.
Figure 2A:
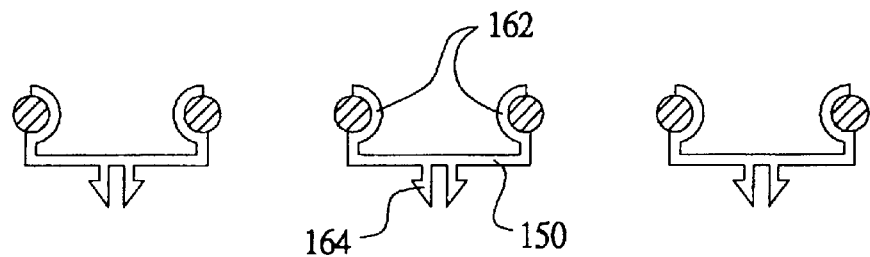
FIG. 2a is a cross-sectional view taken along line 2a—2a of FIG. 2.
Figure 2B:
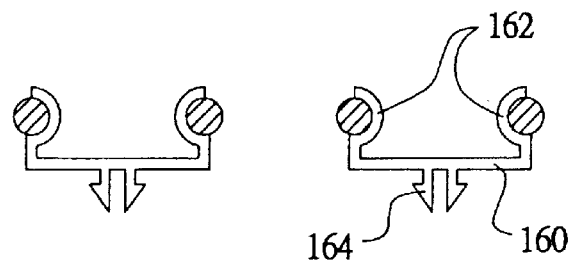
FIG. 2b is a cross-sectional view taken along line 2b—2b of FIG. 2.

FIG. 1 shows an illuminating device 100 according to one embodiment of the present invention. The illuminating device 100 mainly includes three tube-like lamps 110 disposed in the main body. The tube-like lamp 110 has two terminal portions 112 adapted for electrically connecting to a power source (not shown) and a bending portion 114 between the terminal portions 112. The terminal portions 112 of the tube-like lamps 110 are securely attached to the base 120 of the housing. In this embodiment, the illuminating device 100 is provided with several supporting devices 150, 160 each having two hooked portions 162 (see FIG. 2a and FIG. 2b) for supporting the tube-like lamps 110, thereby helping to immobilize the tube-like lamps 110. Referring to FIG. 2, the supporting device 150 is disposed inside the tube-like lamp 110, and adjacent supporting devices 150 are arranged in a line. The supporting device 160 is disposed between two adjacent tube-like lamps 110, and adjacent supporting devices 160 are arranged in a line. The supporting device 150 is preferably at a distance (about 8 cm to about 9 cm) from the bending portion 114 of the tube-like lamp 110. The supporting device 160 is preferably at a distance (about 9 cm to about 10 cm) from the bending portion 114 of the tube-like lamp 110. Preferably, the supporting device 150 and the supporting device 160 are spaced apart from each other by a predetermined distance such as 1 cm or greater, thereby immobilizing the tube-like lamp 110 more efficiently. The supporting devices 150, 160 may have lock means 164 (see FIG. 2a and FIG. 2b) for mounting the supporting devices 150, 160 to the base 120 and the reflection plate 140. It should be understood that the reflection plate 140 is disposed between the tube-like lamp 110 and the base 140 of the housing. Therefore, upon lighting of the tube-like lamps 110 built in the display device, the light directly entering the diffusion plate 142 from the lamps 110 is mixed with the light being reflected by the reflection plate 140 and entering the diffusion plate 142 thereby forming the surface luminance of the diffusion plate 142.

Figures 4A, 4B:
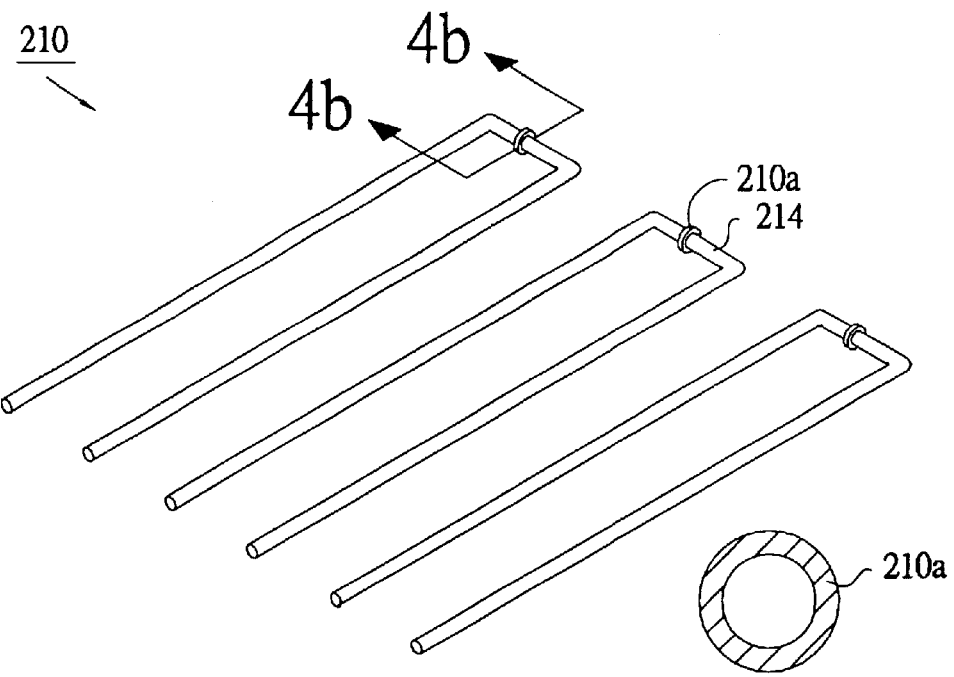
Figures 4C, 4D:
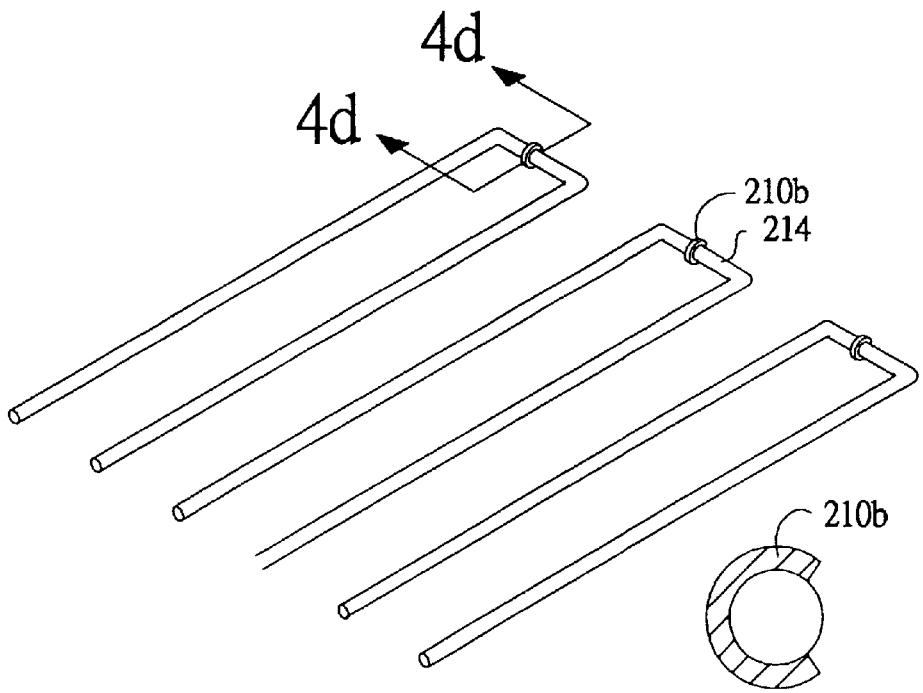
FIG. 4c is a perspective view of another tube-like lamp of FIG. 3 on an enlarged scale.
FIG. 4d is a cross-sectional view taken along line 4d—4d of FIG. 4c.
Figure 5A:
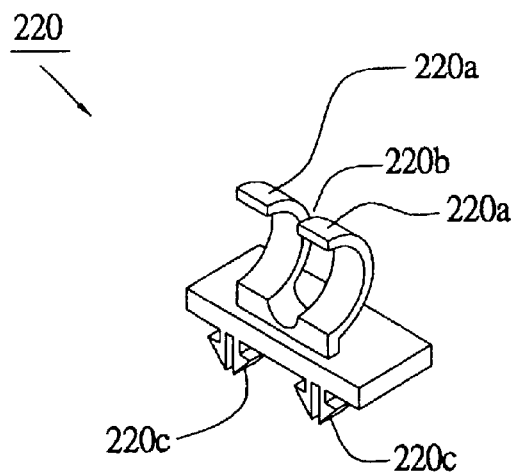
FIG. 5a is a perspective view of the supporting devices of FIG. 3 on an enlarged scale.
Figure 5B:
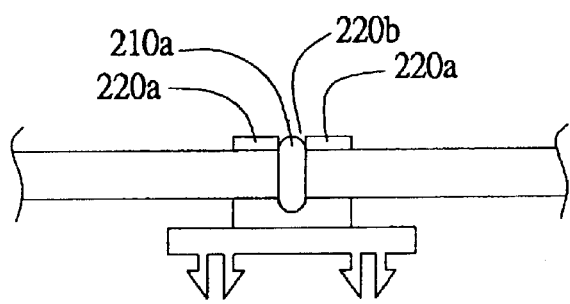
Figure 5C:
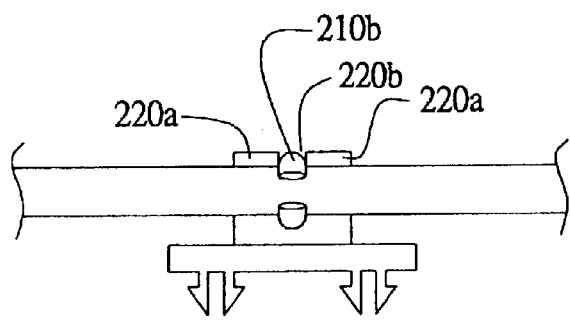

FIG. 3 shows an illuminating device 200 according to another embodiment of the present invention. The illuminating device 200 is substantially identical to the illuminating device 100 of FIG. 1 except tube-like lamps 210 and supporting devices 220. The tube-like lamp 210 has two terminal portions 212 adapted for electrically connecting to a power source (not shown) and a bending portion 214 between the terminal portions 212. Referring to FIG. 4, the tube-like lamp 210 is characterized by having a buffer part, e.g., an O-ring 210a or a C-shaped ring 210b, securely attached on the bending portion 214 for lessening or absorbing the shock of an impact on the tube-like lamp. The supporting device 220 is configured to engage the buffer part of the tube-like lamp 210 thereby helping to immobilize the tube-like lamp. The contact area between the tube-like lamp and the supporting device can be reduced through the installation of the buffer part thereby significantly reducing the heat dissipated from the contact surface between the lamp and the fixing mechanism, i.e., the supporting device. Referring to FIG. 5, the supporting device 220 has two hooked portions 220a and a gap 220b between the hooked portions 220a. Referring to FIG. 5a, the hooked portions 220a of the supporting device 220 are configured to support the tube-like lamp 210, and the buffer part, i.e., the O-ring 210a (see FIG. 5b) or the C-shaped ring 210b (see FIG. 5c), of the tube-like lamp fits with sufficient tightness into the gap 220b between the hooked portions 220a thereby immobilizing the tube-like lamp 210 more efficiently. Referring to FIG. 3 and FIG. 5a, the supporting device 220 may have lock means 220c for mounting the supporting device 220 to the base 120.

The tube-like lamp of the present invention may be a cold cathode fluorescent lamp (CCFL). Although the tube-like lamps 110, 210 is illustrated as U-shaped lamps in the drawings of the present invention, tube-like lamps having various shapes are still considered within the spirit and scope of the invention if the tube-like lamps have terminal portions (for electrically connecting to a power source) all located on the same side. Conceivable shapes are U, V, W, double V, triple U, since each of which may be regarded as a tube-like lamp with terminal portions (for electrically connecting to a power source) all located on the same side. The illuminating devices of the present invention may be designed as a backlight device for a liquid crystal device. The fixing mechanism of the present invention, e.g., the supporting devices 150, 160, 220, is characterized by utilizing two hooked portions to support the tube-like lamp. Comparing to the conventional fasteners configured to directly wrap around the lamp, the fixing mechanism of the present invention significantly reduces the heat dissipated from the contact surface between the lamp and the fixing mechanism. Therefore, the phenomenon of low-temperature pink is not observed when a liquid crystal display using the backlight device of the present invention is placed in a low temperature environment (such as a 0° C. chamber) for conducting a long-time operation test. Furthermore, the fixing mechanism of the present invention is preferably made of materials having a low thermal conductivity, e.g., plastics such as engineering plastics or resin polymer such as PC resin or ABS resin, thereby more efficiently reducing the heat dissipated from the contact surface between the lamp and the fixing mechanism.

Although the invention has been explained in relation to its preferred embodiment, it is to be understood that many other possible modifications and variations can be made without departing from the spirit and scope of the invention as hereinafter claimed.

What is claimed is:

1. An illuminating device comprising:

a lamp having two terminal portions adapted for electrically connecting to a power source and a bending portion between the terminal portions, the lamp comprising a buffer part securely attached on the bending portion; and a main body provided with a supporting device for connecting the buffer part of the lamp thereby helping to fasten the lamp to the main body.

2. The illuminating device as claimed in claim 1, wherein the supporting device has two hooked portions and a gap between the hooked portions, the hooked portions are configured to support the lamp, and the buffer part of the lamp fits into the gap between the hooked portions.

3. The illuminating device as claimed in claim 1, wherein the buffer part is an O-ring.

4. The illuminating device as claimed in claim 1, wherein the buffer part is a C-shaped ring.

5. The illuminating device as claimed in claim 1, wherein the illuminating device is a backlight device for a liquid crystal display.

6. The illuminating device as claimed in claim 1, wherein the main body comprises:

a housing including a base and a case body;

a reflector interposed between the lamp and the base of the housing; and a diffusion plate, wherein the reflector reflects light radiated from the lamp toward the diffusion plate.

7. The illuminating device as claimed in claim 1, wherein the main body comprises:

a housing including a base and a case body;

a reflector interposed between the lamp and the base of the housing; and a diffusion plate sealing the top of the case body of the housing, wherein the terminal portions of the lamp are disposed along one side of the base.

8. An illuminating device comprising:

a first lamp having two terminal portions adapted for electrically connecting to a power source and a bending portion between the terminal portions;

a main body provided with a first supporting device, the first supporting device having two hooked portions configured to support the first lamp thereby helping to fasten the lamp to the main body;

a second lamp having two terminal portions adapted for electrically connecting to a power source and a bending portion between the terminal portions;

a second supporting device disposed on the main body, the second supporting device having two hooked portions configured to support the second lamp; and a third supporting device disposed on the main body and disposed between the first lamp and the second lamp, the third supporting device having two hooked portions configured to support the first lamp and the second lamp.

9. An illuminating device comprising:

a first lamp having two terminal portions adapted for electrically connecting to a power source and a bending portion between the terminal portions;

a main body provided with a first supporting device, the first supporting device having two hooked portions configured to support the first lamp thereby helping to fasten the lamb to the main body;

a housing including a base and a case body mounted on the base;

a reflector interposed between the lamp and the base of the housing; and a diffusion plate sealing the top of the case body of the housing, wherein the terminal portions of the lamp are disposed along one side of the base.

* * * * *